(12) United States Patent
Isoyama (10) Patent No.: US 9,380,115 B2
(45) Date of Patent: Jun. 28, 2016

(54) EVENT PROCESSING SYSTEM AND EVENT PROCESSING METHOD (75) Inventor: Kazuhiko Isoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 554 days.

(21) Appl. No.: 12/919,634

(22) PCT Filed: Mar. 6, 2009

(86) PCT No.: PCT/JP2009/001016
§ 371 (c)(1),
(2), (4) Date: Aug. 26, 2010

(87) PCT Pub. No.: WO2009/110246
PCT Pub. Date: Sep. 11, 2009

(65) Prior Publication Data
US 2010/0333114 A1    Dec. 30, 2010

(30) Foreign Application Priority Data
Mar. 7, 2008  (JP) ................. 2008-058733

(51) Int. Cl.
G06F 9/54      (2006.01)
H04L 29/08     (2006.01)

(52) U.S. Cl.
CPC ..................... H04L 67/12 (2013.01)

(58) Field of Classification Search
CPC ..................................... H04L 45/12
See application file for complete search history.

(56) References Cited

U.S. PATENT DOCUMENTS

| 6,643,682 | B1 * | 11/2003 | Todd et al. ............... | 709/202 |
| 6,650,621 | B1 * | 11/2003 | Maki-Kullas ............ | 370/238 |
| 2002/0038360 | A1 * | 3/2002 | Andrews et al. ........ | 709/223 |
| 2003/0235155 | A1 * | 12/2003 | Boivie et al. ............ | 370/238 |
| 2006/0031393 | A1 * | 2/2006 | Cooney et al. .......... | 709/217 |
| 2006/0047464 | A1 * | 3/2006 | Kumar et al. ........... | 702/122 |
| 2006/0230077 | A1 * | 10/2006 | Satou et al. ............. | 707/200 |
| 2008/0294585 | A1 * | 11/2008 | Hwang et al. ........... | 706/47 |
| 2010/0027515 | A1 * | 2/2010 | Hylton ..................... | 370/338 |
| 2010/0121826 | A1 * | 5/2010 | Mitsuhashi .............. | 707/693 |

FOREIGN PATENT DOCUMENTS

JP    2002091843  A    3/2002
JP    2002374290  A    12/2002

(Continued)

OTHER PUBLICATIONS

International Search Report for PCT/JP2009/001016 mailed Jun. 9, 2009.

(Continued)

*Primary Examiner* — Syed Roni (57) ABSTRACT

An event processing system includes a first event unit which causes an application 107 to obtain a list of event processing servers from an event processing distributor 103, select an event processing server 105 where the distance on a network with respect to the application 107 is shortest, from the list, and transmit a request where information thereof is added to the event processing distributor 103, and a second event unit which causes an event generation source 106 to obtain a list of information of an event distributor 104 from the event processing distributor 103, select the event distributor 104 where the distance on the network with respect to the event generation source is shortest, from the list, and transmit an event to the selected event distributor 104.

29 Claims, 7 Drawing Sheets

(56) References Cited

FOREIGN PATENT DOCUMENTS

| | | |
|---|---|---|
| JP | 2003256303 A | 9/2003 |
| JP | 2006309701 A | 11/2006 |
| JP | 2008-22178 A | 1/2008 |

OTHER PUBLICATIONS

Japanese Office Action for JP Application No. 2008-058733 Mailed on Aug. 13, 2013 with Partial English Translation.

* cited by examiner

EVENT PROCESSING SYSTEM AND EVENT PROCESSING METHOD

This application is the National Phase of PCT/JP2009/001016, filed Mar. 6, 2009, which claims the benefit of priority based on Japanese Patent Application No. 2008-058733, filed on Mar. 7, 2008, the disclosure of which is hereby incorporated by reference in its entirety.

TECHNICAL FIELD

The present invention relates to processing and distributing information and particularly, to processing and distributing of the large amount of information (events) that are generated from a device, such as an RFID sensor.

BACKGROUND ART

Figure 5:
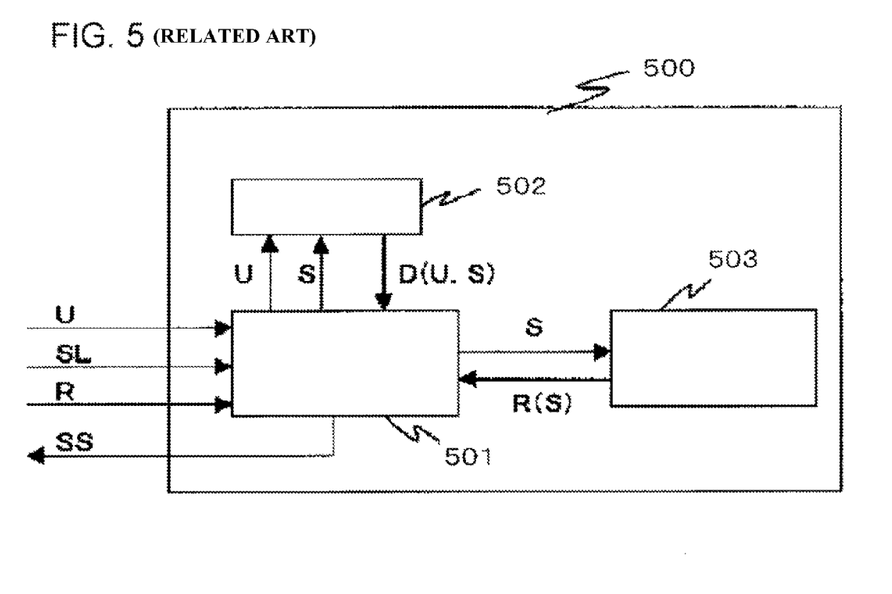
FIG. 5 illustrates a functional block of a conventional server selecting apparatus.

As an association technology, for example, Patent Document 1 is known. FIG. 5 illustrates a functional block of a server selecting apparatus that is disclosed in Patent Document 1. A server selecting apparatus 500 includes a server selecting unit 501, a distance acquiring unit 502, and a remaining resource amount acquiring unit 503. In FIG. 5, U indicates identification information of a user, S indicates identification information of a server, SL indicates a server list (list of server identification information), R indicates the amount of needed server resources, D(U, S) indicates distance information between a base U and a base S, R(S) indicates the remaining resource amount of the server S, and SS indicates identification information of a server that is selected by the server selecting unit.

Figure 6:
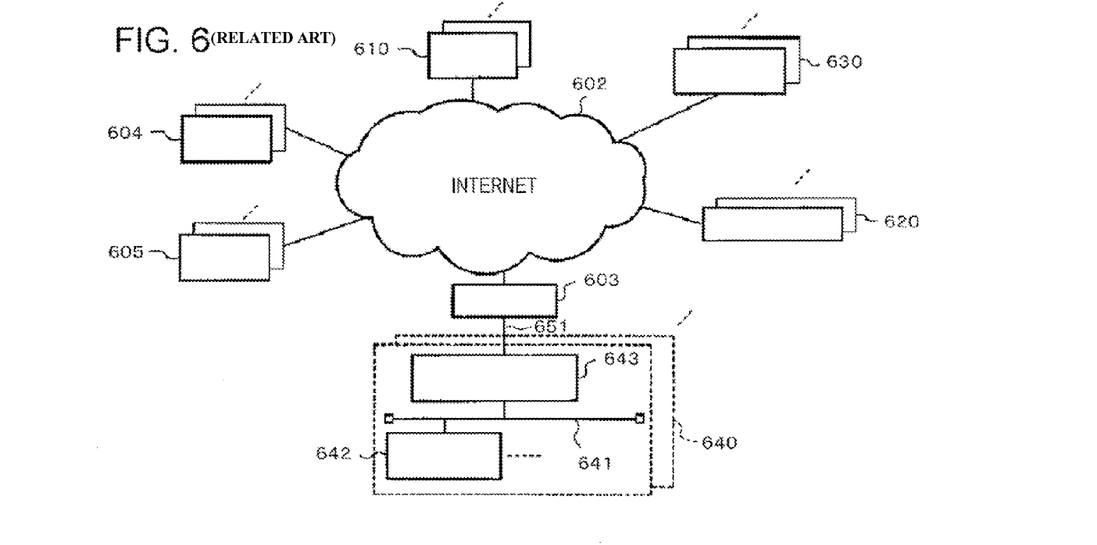
FIG. 6 illustrates the configuration of a conventional load distributing system.

As another association technology, Patent Document 2 is known. FIG. 6 illustrates the configuration of a load distributing system that is disclosed in Patent Document 2. FIG. 6 illustrates a managing server 610 that is provided to perform entire system management of a network system, an information providing server 620 that holds information provided to a client, a network monitoring server 630 corresponding to an information providing server that monitors a network and holds information provided to the client, a DNS/DAP server 604 that manages a domain name, an NTS server 605 that manages a time, and a client system 640 that receives needed information from the server. The client system 640 includes an input device 1 or a plurality of client terminals 642 and a managing server 643 for client terminals, which are connected to a LAN 641. An IPS (Intrusion Prevention System) 603 is a tool that prevents illegally intrusion into the server or the network. For example, the managing server 643 for the client terminals acquires authentication information of an ADSL 651 from an ISP 3.

Figure 7:
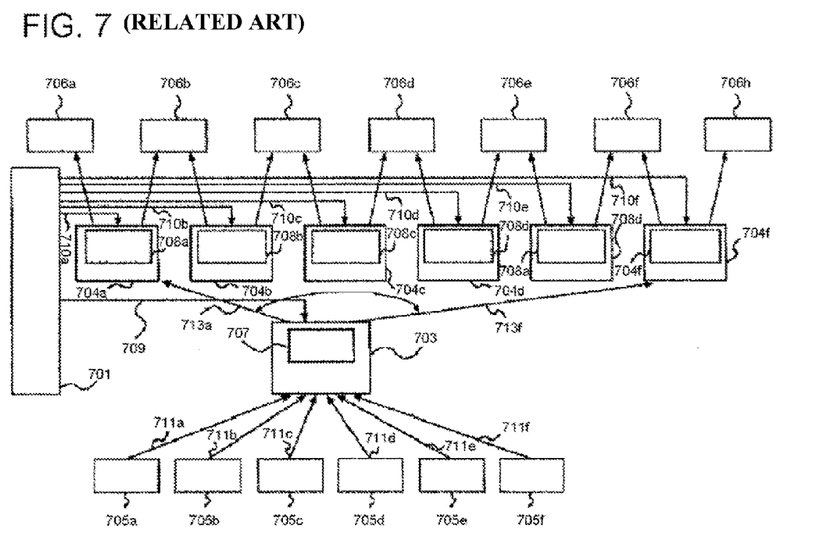
FIG. 7 illustrates the configuration of a conventional load distributing system.

As still another association technology, Patent Document 3 is known. FIG. 7 illustrates a load distributing system that is disclosed in Patent Document 3. An event processing distribution control unit 701 sets processing rules 708a to 708f of event processing required by applications 706a to 706f to processing servers 704a to 704f (refer to arrows 710a to 710f).

When the processing rules 708a to 708f of the event processing that are required by the applications 706a to 706h are set, in an RFID system, the application 706a that notifies detection if all RFID tags of all members needed to produce a product are completely detected sets a rule of "notifying applications of detection, if all RFID tags of all members are completely detected" to the processing rule 708a of the processing server 704a (refer to arrow 710a).

Next, the event processing distribution control unit 701 sets a distribution rule 707 to a context-dependent distributor 703, such that events, which need to be processed by the processing servers according to the set processing rules 708a to 708f, are appropriately distributed to the processing servers (refer to arrow 709). In the case of the above example, a rule of "detection events of the RFID tags of the members that are related to the product are transmitted to the processing server 704a" is set.

Events 711a to 711f that are generated by devices 705a to 705f are all received by the context-dependant distributor 703. The context-dependant distributor 703 that receives the events generated by the devices 705a to 705f refers to contents (context) of the events and transmits the contents to the appropriate processing servers 704a to 704f according to the distribution rule 707 (refer to arrows 713a to 713f).

The processing servers that receive the events 713a to 713f distributed by the context-dependant distributor 703 transmit the events to the applications 706a to 706h according to the processing rule 707 (refer to 714a to 714i).

As such, the load distribution system is based on a system in which the applications request the system to process generation information (events) from devices, such as an RFID reader and a sensor, as a processing rule, and the system performs processing based on event contents (context), according to the requested rule and notifies the applications of a processing result. The processing rule is configured to perform processing based on the event contents (context).

[Patent Document 1] Japanese Laid-open patent publication NO. 2002-91843

[Patent Document 2] Japanese Laid-open patent publication NO. 2003-256303

[Patent Document 3] Japanese Laid-open patent publication NO. 2006-309701

DISCLOSURE OF THE INVENTION

However, in the associated technologies that are described in Patent Documents, there is room for improvement as follows. Patent Documents 1 and 2 describe selection of a server that is disposed near a user to alleviate a load when the large amount of data is handled, but do not describe an event generation source and an event distributor. Patent Document 3 describes an event processing apparatus but does not describe an event processing system in which event transmission delay is improved.

The present invention relates to processing and distributing of the large amount of information (events) generated from a device such as an RFID sensor. One event generation source generates events by changing places many times. The plurality of events may be simultaneously generated. However, the events that are simultaneously generated in various places may not be handled as the simultaneously generated events, due to the variation in distance with the event distributor. As such, an event processing system in which event transmission delay is improved is not disclosed.

According to the present invention, there is provided an event processing system including:

a plurality of event processing servers which process transmitted events according to an event processing rule set in advance and notify an application of processing results;

a plurality of event distributors which transmit events received from an event generation source to the event processing servers according to an event transmission rule set in advance;

an event processing distributor which manages the plurality of event processing servers and the plurality of event distributors and sets the event processing rule received from the application to the event processing servers;

a first event unit which causes the application to obtain a list where information of the event processing servers is described from the event processing distributor, select the event processing server where the distance on a network with respect to the application is shortest, from the list, and transmit an event processing request where information of the selected event processing server is added to the event processing distributor; and a second event unit which causes the event generation source to obtain a list where information of the event distributors is described, from the event processing distributor, select the event distributor where the distance on the network with respect to the event generation source is shortest, from the list, and transmit the event to the selected event distributor.

According to the present invention, there is provided an event processing method including:

causing a plurality of event processing servers to process transmitted events according to an event processing rule set in advance and notify an application of processing results;

causing a plurality of event distributors to transmit events received from an event generation source to the event processing servers according to an event transmission rule set in advance;

causing an event processing distributor to manage the plurality of event processing servers and the plurality of event distributors and set the event processing rule received from the application to the event processing servers;

executing event processing for causing the application to obtains list where information of the event processing servers is described from the event processing distributor, select the event processing server where the distance on a network with respect to the application is shortest, from the list, and transmit an event processing request where information of the selected event processing server is added to the event processing distributor; and executing event processing for causing the event generation source to obtain a list where information of the event distributors is described, from the event processing distributor, select the event distributor where the distance on the network with respect to the event generation source is shortest, from the list, and transmit the event to the selected event distributor.

According to the present invention, since a method that can reduce a processing time of event processing based on the Internet is provided, event transmission delay can be reduced.

BRIEF DESCRIPTION OF THE DRAWINGS

The above and other objects, features, and advantages of the present invention will be more apparent from the following description of certain preferred embodiments taken in conjunction with the accompanying drawings.

BEST MODE FOR CARRYING OUT THE INVENTION

Hereinafter, embodiments of the present invention will be described using the drawings. Like reference numerals designate like elements throughout the drawings and the description will not be repeated.

(First Embodiment)

Figure 1:
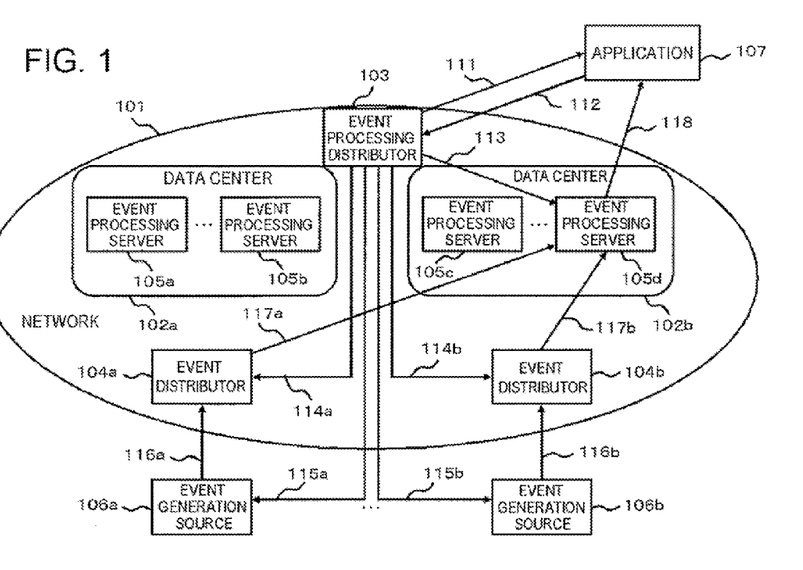
FIG. 1 illustrates the configuration of an event processing/distributing system according to a first embodiment of the present invention.

An event processing system according to a first embodiment includes a plurality of event processing servers 105a to 105d that process transmitted events 117a and 117b according to an event processing rule 113 set in advance, and notify an application 107 of a processing result 118, a plurality of event distributors 104a and 104b that transmit events 116a and 116b received from event generation sources 106a and 106b to the event processing servers 105a to 105d according to an event transmission rule set in advance, and an event processing distributor 103 that manages the plurality of event processing servers 105a to 105d and the plurality of event distributors 104a and 104b and sets the event processing rule 113 received from the application 107 to the event processing servers 105a to 105d.

The event processing system further includes a first event unit that causes the application 107 to obtain a list 111 of the event processing servers where information of the event processing servers 105a to 105d is described from the event processing distributor 103, selects the event processing server 105d where the distance on a network with respect to the application 107 is shortest, from the list, and transmit a request of an event processing rule 112 where information of the selected event processing server 105d is added to the event processing distributor 103 and a second event unit that causes the event generation sources 106a and 106b to obtain lists 115a and 115b of the event distributors where information of the event distributors 104a and 104b is described, from the event processing distributor 103, select the event distributor 104a or 104b where the distances on the network with respect to the event generation sources 106a and 106b are shortest, from the lists 115a and 115b, and transmit the event 116a or 116b to the selected event distributor 104a or 104b.

In FIG. 1, data centers 102a and 102b are disposed in a plurality of places of the network 101. In the data centers 102a and 102b, the plurality of event processing servers 105a to 105d are connected to the network 101 and are provided. The event processing distributor 103 and the plurality of event distributors 104a and 104b are disposed in arbitrary places that are connected to the network 101. The event processing distributor 103 and the plurality of event distributors 104a and 104b may be disposed in any of the data centers 102a and 102b. The application 107 is a terminal or a server that includes a micro processor, a ROM, and a RAM and is operated by application software according to a use object.

Next, the operation of the first embodiment will be described with reference to FIG. 1. The application 107 that requests event processing obtains the list 111 of the event processing servers that is delivered from the event processing distributor 103 to the application 107 before requesting the event processing.

Figure 2:
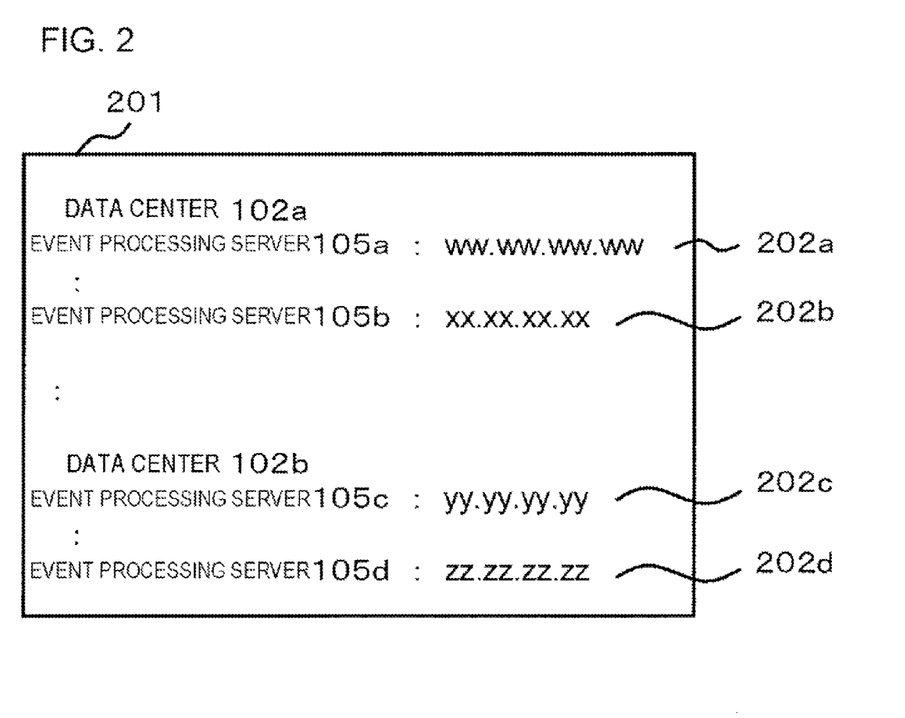
FIG. 2 illustrates an example of a list of event processing servers 105a to 105d according to the first embodiment of the present invention.

In this case, an example of a list 201 of the event processing servers 105a to 105d is shown in FIG. 2. In the list 201 of the event processing servers 105a to 105d, the data centers 102a and 102b on the network 101, names and identifiers of the event processing servers 105a to 105d in the data centers 102a and 102b, and addresses (IP addresses and URLs) 202a to 202d of the event processing servers 105a to 105d are described. Further, information of network apparatuses (router or the like) other than the event processing servers 105a to 105d in the data centers 102a and 102b may be described.

The application 107 that obtains the list 201 of the event processing servers measures the distances on the network between the application 107 and the event processing servers 105a to 105d that are described in the list 201 of the event processing servers. Such a measuring method includes a method in which the application 107 transmits Ping (to measure a communication time and obtain the distance) to the address 202a or 202b of each of the event processing servers 105a to 105d and calculates a response time thereof (not shown in the drawings). This measuring method may be performed on all of the event processing servers 105a to 105d that are described in the list 201 of the event processing servers or the individual representative event processing servers 105a to 105d (for example, 105a and 105c) may be selected from the data centers 102a and 102b and the measuring method may be performed on only the event processing servers selected from the data centers 102a and 102b. When the information of the network apparatuses other than the event processing servers 105a to 105d in the data centers 102a and 102b is described in the list, the measurement may be performed on the network apparatuses.

The event processing distributor 103 that receives information of the event processing server (105c or 105d in the case of the above example) determined by the application 107 that has completed the measurement as the event processing server closest to the application 107 and the event processing rule 112 selects the event processing server 105c or 105d to set the received event processing rule 112 and sets the event processing rule 113 to the selected event processing server 105c or 105d. The event processing server 105c or 105d where the event processing rule 113 is set may be the event processing server that is designated from the application 107. When there is the event processing server that is more desirable than the designated event processing server due to a certain reason (the case where another event processing server is preferably set to distribute a load, another event processing rule to handle the same event is already set to another event processing server, and it is effective to set the event processing rule 113 to the event processing server), the event processing server may be another event processing server in the same data center. When the measurement is performed with respect to the network apparatuses other than the event processing servers 105a to 105d in the data centers 102a and 102b, the application 107 may notify information of the data center 102b that is determined as the data center closest to the application 107, and the selection of the event processing server 105c or 105d to set the event processing rule 113 may be performed by the event processing distributor 103.

At the same time, the event processing distributor 103 sets event distribution rules 114a and 114b that are set to the event distributor, such that the events handled according to the event processing rule are transmitted to the event processing server 105d where the event processing rule is set.

As such, the event processing distributor selects the event processing server, sets the event processing rule 113 to the event processing server 105d, sets the event distribution rule to the event distributor, and manages the event processing server and the event distributor.

Next, the event generation sources 106a and 106b that generate the events obtain the lists 115a and 115b of the event distributors 104a and 104b from the event processing distributor 103 before transmitting the events. In the lists 115a and 115b of the event distributors, names or identifiers of the event distributors 104a and 104b on the network 101 and addresses of the event distributors 104a and 104b are described (not shown in the drawings).

The event generation sources 106a and 106b that obtain the lists 115a and 115b of the event distributors 104a and 104b measure the distances on the network 101 between the event distributors 104a and 104b described in the lists 115a and 115b of the event distributors and the event generation sources 106a and 106b. Such a measuring method includes a method in which the event generation sources 106a and 106b transmit ping to the addresses of the event distributors 104a and 104b and measure response times thereof.

The event generation sources 106a and 106b that has completed the measurement transmit the events 116a and 116b to the event distributor (104a in the case of the event generation source 106a and 104b in the case of the event generation source 106b) that is determined as the event distributor closest to the event generation sources 106a and 106b. The event distributors 104a and 104b that receive the events 116a and 116b transmit the events 117a and 117b to the event processing server 105d set by the processing rule 113, based on the event distribution rules 114a and 114b.

The event processing server 105d that receives the transmitted events 117a and 117b processes the events 117a and 117b, based on the event processing rule 113 set to the event processing server 105d, and notifies the application 107 of a requester of an event processing result 118.

In the above operation example, the application 107 that requests the event processing measures the distances on the network between the application 107 and the event processing servers 105a to 105d, whenever the application requests the processing. However, the application 107 may include a cache memory, may store measurement information in a cache memory after the first measurement, and may not perform measurement at the time of the second and following event processing requests. Likewise, in the above operation example, the event generation sources 106a and 106b that generate the events measure the distances on the network 101 between the event generation sources 106a and 106b and the event distributors 104a and 104b, whenever the event generation sources generate the event. However, the event generation sources 106a and 106b may include cache memories, may store measurement information in the cache memories after the first measurement, and may not perform measurement at the time of the second and following event generations.

In the above operation example, the application 107 that requests the event processing or the event generation sources 106a and 106b that generate the events actually measure the distances on the network 101 between the event generation sources 106a and 106b and the event processing servers 105a to 105d or the event distributors 104a and 104b. However, the measurement is not actually performed, and the event distributors 104a and 104b or the event processing servers 105a to 105d of the network addresses where the distances on the network with respect to the event generation sources 106a and 106b are shortest may be selected while a network address portion of addresses described in the list 111 of the event processing servers or the lists 115a and 115b of the event distributors to be obtained is viewed.

According to this embodiment, the event generation sources 106a and 106b that transmit the events receive the lists 115a and 115b of the event distributors 104a and 104b from the event processing distributor 103 before transmitting the events, select the event distributor 104a or 104b where the distances on the network with respect to the event generation sources 106a and 106b are shortest, based on the lists, and transmit the event 116a or 116b to the selected event distributor. As a result, the event transmission delay can be reduced.

The plurality of event processing servers 105a to 105d are disposed in the plurality of data centers 102a and 102b, and the application 107 that requests the event processing receives the list 111 of the event processing servers from the event processing distributor 103 before requesting the event processing, selects the event processing server where the distance on the network with respect to the application 107 is shortest, based on the list, designates the selected event processing servers 105a to 105d to the event processing distributor 103, and requests the event processing rule 112. The event processing distributor 103 can select the event processing server 105d while considering the designated event processing server, set the event processing rule 113, and set the event processing rule of the application 107 to the event processing server 105c or 105d where the distance on the network with respect to the application 107 is shortest. As a result, the delay of the notification of the event processing result can be reduced.

Next, an event processing method according to this embodiment will be described. An event processing method according to this embodiment includes causing the plurality of event processing servers 105a and 105b to process the transmitted events 117a and 117b according to the event processing rule 113 set in advance and notify the application 107 of a processing result, causing the plurality of event distributors 104a to transmit the events 117a and 117b received from the event generation sources 106a and 106b to the event processing servers 105a to 105d according to an event transmission rule set in advance, causing the event processing distributor 103 to manage the plurality of event processing servers 105a to 105d and the plurality of event distributors 104a and 104b and set the event processing rule 113 received from the application 107 to the event processing servers 105a to 105d, executing event processing for causing the application 107 to obtain the list 111 of the event processing servers where information of the event processing servers 105a to 105d is described from the event processing distributor 103, select the event processing server 105d where the distance on a network with respect to the application 107 is shortest, from the list, and transmit an event processing request where information of the selected event processing server 105d is added to the event processing distributor 103, and executing event processing for causing the event generation source 106a to obtain the lists 115a and 115b where information of the event distributors 104a and 104b is described, from the event processing distributor 103, select the event distributor 104a where the distance on the network with respect to the event generation source 106a is shortest, from the lists, and transmit the event to the selected event distributor 104a.

According to this embodiment, the event generation sources 106a and 106b that transmit the events receive the lists 115a and 115b of the event distributors 104a and 104b from the event processing distributor 103 before transmitting the events, select the event distributor 104a or 104b where the distances on the network with respect to the event generation sources 106a and 106b are shortest, based on the lists, and transmit the event 116a or 116b to the selected event distributor. As a result, the event transmission delay can be reduced.

The plurality of event processing servers 105a to 105d are disposed in the plurality of data centers 102a and 102b, and the application 107 that requests the event processing receives the list 111 of the event processing servers from the event processing distributor 103 before requesting the event processing, selects the event processing server where the distance on the network with respect to the application 107 is shortest, based on the list, designates the selected event processing servers 105a to 105d to the event processing distributor 103, and requests the event processing rule 112. The event processing distributor 103 can select the event processing server 105d while considering the designated event processing servers, set the event processing rule 113, and set the event processing rule of the application 107 to the event processing server 105d where the distance on the network with respect to the application 107 is shortest. As a result, the delay of the notification of the event processing result can be reduced.

(Second Embodiment)

Figure 3:
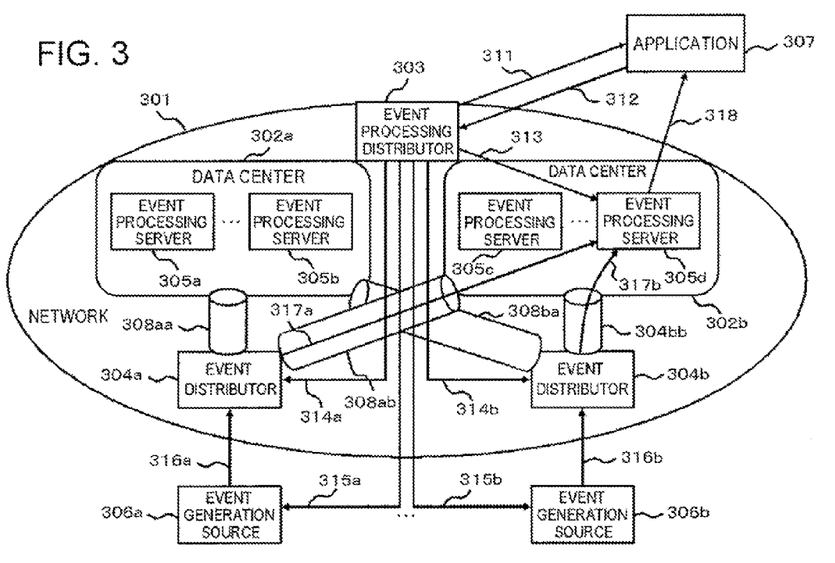
FIG. 3 illustrates the configuration of an event processing/distributing system according to a second embodiment of the present invention.

FIG. 3 illustrates a second embodiment.

In the second embodiment, high-speed dedicated lines 308aa to 304bb are disposed between the event distributors 304a and 304b and the data centers 302a and 302b, and the events 317a and 317b are transmitted from each of the event distributors 304a and 304b to the event processing servers 305a to 305d, using the high-speed dedicated lines 308aa to 308bb. Thereby, even though the event distributors 304a and 304b and the data centers 302a and 302b are disposed in places that are geographically apart from each other, high-speed event transmission is enabled between the event distributors 304a and 304b and the event processing servers 305a to 305d.

(Third Embodiment)

Figure 4:
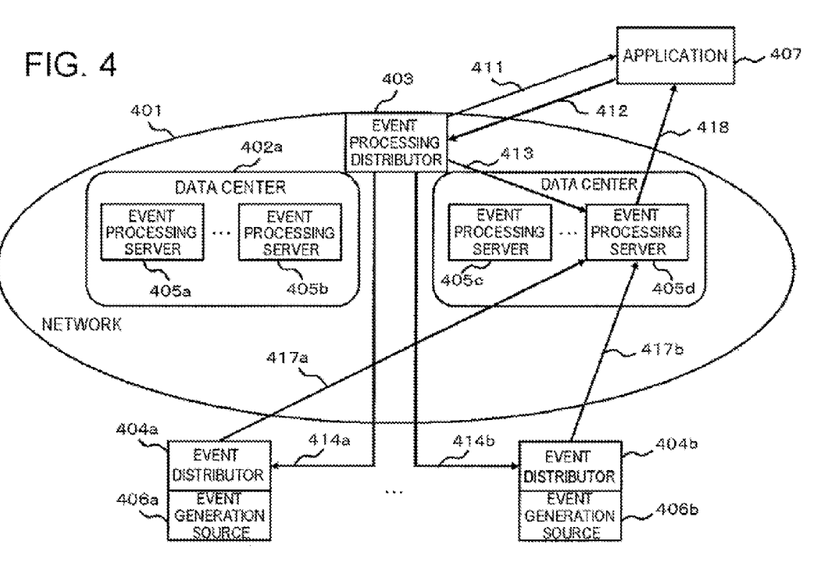
FIG. 4 illustrates the configuration of an event processing/distributing system according to a third embodiment of the present invention.

FIG. 4 illustrates a third embodiment.

In the third embodiment, event distributors 404a and 404b are disposed in event generation sources 406a and 406b. Thereby, the event generation sources 406a and 406b do not need to search the event distributor disposed at the shortest distance on a network 401. Further, an event distribution load can be distributed to each of the event generation sources 406a and 406b.

The embodiments of the present invention will be described with reference to the drawings. However, the embodiments of the present invention are only exemplary and various configurations other than the embodiments may be adopted.

In the above embodiments, the currently used Internet is exemplified as a data network. However, the data network may be an NGN (Next Generation Network) that is a next-generation Internet.

The above embodiments and plurality of modifications may be combined with each other within a range where the contents do not disagree with. each other. In the above embodiments and the modifications, the structures of the individual units are specifically described, but the structures may be variously changed within a range where the present invention is satisfied.

The preferred embodiments of the present invention are further described.

(1) An event processing system includes a plurality of event processing servers which process transmitted events according to a set event processing rule and notify a plurality of applications of processing results; a plurality of event distributors which transmit events received from an event generation source to the event processing servers according to a set event transmission rule; an event processing distributor which manages the plurality of event processing servers and the plurality of event distributors and sets the event processing rule received from the application to the event processing servers; a first event unit which causes the application to obtain a list where information of the event processing servers is described from the event processing distributor, select the event processing server close to the application, from the list, and transmit an event processing request where information of the selected event processing server is added to the event processing distributor; and a second event unit which causes the event generation source to obtain a list where information of the event distributors is described, from the event processing distributor, select the event distributor close to the event generation source, from the list, and transmit the event to the selected event distributor.

(2) In the event processing system, the plurality of event processing servers are disposed in a plurality of data centers.

(3) In the event processing system, when the event generation source selects the event distributor close to the event generation source, the event generation source measures round-trip times which are needed for communication with the event distributors described in the list of the event distributors, and selects the event distributor having the shortest round-trip time.

(4) In the event processing system, when the event generation source selects the event distributor close to the event generation source, the event generation source selects the event distributor having a network address close to the event generation source, while viewing a network address portion of addresses of the event distributors described in the list of the event distributors.

(5) In the event processing system, when the event generation source transmits the events, the event generation source caches information of the previously selected event distributors without obtaining the list of the event distributors and selecting the event distributor close to the event generation source, and transmits the events to the cached event distributors.

(6) In the event processing system, high-speed dedicated lines are provided between the event distributors and the data centers, and the events are transmitted from the event distributors to the event processing servers, using the high-speed dedicated lines.

(7) In the event processing system, functions of the event distributors are disposed in the event generation source.

(8) In the event processing system, the event processing distributor which receives the event processing request from the application sets the event processing rule to the event processing server selected by adding the event processing request or another event processing server disposed in the same data center as the selected event processing server.

(9) In the event processing system, when the application selects the event processing server close to the application, the application measures round-trip times which are needed for communication with the event processing servers described in the list of the event processing servers, and selects the event processing server having the shortest round-trip time.

(10) In the event processing system, when the application selects the event processing server close to the application, the application extracts the event processing servers, which are described in the list of the event processing servers and are disposed in the data centers, one by one from the data centers, measures round-trip times which are needed for communication with the extracted event processing servers, and selects the event processing server having the shortest round-trip time.

(11) In the event processing system, when the application selects the event processing server close to the application, the application selects the event processing server having a network address close to the application, while viewing a network address portion of addresses of each of the event processing servers described in the list of the event processing servers.

(12) In the event processing system, when the application requests the event processing, the application adds a list of the event processing servers accumulated by caching information of the previously selected event processing servers without obtaining the list of the event processing servers and selecting the event processing server close to the application and information of the cached event processing servers and requests the event processing distributor to process the events.

(13) An event processing method includes causing a plurality of event processing servers to process transmitted events according to a set event processing rule and notify a plurality of applications of processing results; causing a plurality of event distributors to transmit events received from an event generation source to the event processing servers according to a set event transmission rule; causing an event processing distributor to manage the plurality of event processing servers and the plurality of event distributors and set the event processing rule received from the application to the event processing servers; executing event processing for causing the application to obtain a list where information of the event processing servers is described from the event processing distributor, select the event processing server close to the application, from the list, and transmit an event processing request where information of the selected event processing server is added to the event processing distributor; and executing event processing for causing the event generation source to obtain a list where information of the event distributors is described, from the event processing distributor, select the event distributor close to the application, from the list, and transmit the event to the selected event distributor.

(14) In the event processing method, the plurality of event processing servers is disposed in a plurality of data centers, and the event processing distributor which receives the event processing request from the application sets the event processing rule to another event processing server disposed in the same data center as the selected event processing server.

(15) In the event processing method, when the event generation source selects the event distributor close to the event generation source, the event generation source measures round-trip times which are needed for communication with each of the event distributors described in the list of the event distributors, and selects the event distributor having the shortest round-trip time.

(16) In the event processing method, when the event generation source selects the event distributor close to the event generation source, the event generation source selects the event distributor having a network address close to the event generation source, while viewing a network address portion of addresses of each of the event distributors described in the list of the event distributors.

(17) In the event processing method, when the event generation source transmits the events, the event generation source caches information of the previously selected event distributors without obtaining the list of the event distributors and selecting the event distributor close to the event generation source, and transmits the events to the cached event distributors.

(18) In the event processing method, the event processing distributor which receives the event processing request from the application sets the event processing rule to the event processing server selected by adding the event processing request.

(19) In the event processing method, when the application selects the event processing server close to the application, the application measures round-trip times which are needed for communication with the event processing servers described in the list of the event processing servers, and selects the event processing server having the shortest round-trip time.

(20) In the event processing method, when the application selects the event processing server close to the application, the application extracts the event processing servers, which are described in the list of the event processing servers and are disposed in the data centers, one by one from the data centers, measures round-trip times which are needed for communication with the extracted event processing servers, and selects the event processing server having the shortest round-trip time.

(21) In the event processing method, when the application selects the event processing server close to the application, the application selects the event processing server having a network address close to the application, while viewing a network address portion of addresses of each of the event processing servers described in the list of the event processing servers.

(22) In the event processing method, when the application requests the event processing, the application adds a list of the event processing servers accumulated by caching information of the previously selected event processing servers without obtaining the list of the event processing servers and selecting the event processing server close to the application and information of the cached event processing servers and requests the event processing distributor to process the events.

The invention claimed is:

1. An event processing system, comprising:
   a plurality of event processing servers, connected to a network, which process transmitted events according to an event processing rule set in advance and notify an application of processing results;
   a plurality of event distributors, connected to the network, which transmit events received from an event generation source to at least one of said event processing servers according to an event transmission rule set in advance which defines the at least one of said event processing servers to which the events received from the event generation source is to be transmitted;
   an event processing distributor, connected to the network, which sets the event processing rule received from said application to said event processing servers, and which sets the event transmission rule to said plurality of event distributors;
   a first event unit which causes said event generation source to obtain a list where information of said event distributors is described, to select the event distributor where a distance on a network with respect to said event generation source is shortest, from the list, and to transmit said event to said selected event distributor; and
   a second event unit which is configured to cause said application to obtain a list where information of said event processing servers is described from the event processing distributor, to select the event processing server where the distance on a network with respect to said application is shortest, from the list, and to transmit an event processing request where information of said selected event processing server is added to said event processing distributor,
   wherein the event processing distributor is configured to set an event transmission rule indicating said selected event processing server based on the transmitted event processing request to said selected event distributor.

2. The event processing system as set forth in claim 1, wherein said plurality of event processing servers are disposed in a plurality of data centers.

3. The event processing system as set forth in claim 2, further comprising:
   high-speed dedicated lines which are provided between said event distributors and said data centers,
   wherein the events are transmitted from said event distributors to said event processing servers, using said high-speed dedicated lines.

4. The event processing system as set forth in claim 2, wherein said event processing distributor sets said event processing rule to the event processing server selected by adding an event processing request or another event processing server disposed in the same data center as said selected event processing server.

5. The event processing system as set forth in claim 2, wherein, when said application selects the event processing server where the distance on the network with respect to the application is shortest, said application extracts the event processing servers, which are described in a list of said event processing servers and are disposed in said data centers, one by one from said data centers, measures round-trip times which are needed for communication with the extracted event processing servers, and selects the event processing server including the shortest round-trip time.

6. The event processing system as set forth in claim 1, wherein, when said event generation source selects the event distributor where the distance on the network with respect to the event generation source is shortest, said event generation source measures round-trip times which are needed for communication with each of the event distributors described in the list of said event distributors, and selects the event distributor including the shortest round-trip time.

7. The event processing system as set forth in claim 1, wherein, when said event generation source selects the event distributor where the distance on the network with respect to the event generation source is shortest, said event generation source selects the event distributor including a network address where the distance on a network with respect to the event generation source is shortest, while viewing a network address portion of addresses of each of the event distributors described in the list of said event distributors.

8. The event processing system as set forth in claim 1, wherein said event generation source includes a cache memory, and
   when said event generation source transmits the events, said event generation source stores information of the previously selected event distributors in said cache memory without obtaining the list of said event distributors and selecting the event distributor where the distance on the network with respect to the event generation source is shortest, and transmits the events to the stored event distributors.

9. The event processing system as set forth in claim 1, wherein functions of said event distributors are disposed in said event generation source.

10. The event processing system as set forth in claim 1, wherein, when said application selects the event processing server where the distance on the network with respect to the application is shortest, said application measures round-trip times which are needed for communication with each of the event processing servers described in a list of said event processing servers, and selects the event processing server including the shortest round-trip time.

11. The event processing system as set forth in claim 1, wherein, when said application selects the event processing server where the distance on the network with respect to the application is shortest, said application selects the event processing server including a network address where the distance on the network with respect to the application is shortest, while viewing a network address portion of addresses of each of the event processing servers described in a list of said event processing servers.

12. The event processing system as set forth in claim 1, wherein said application includes a cache memory, and when said application requests the event processing, said application adds a list of the event processing servers accumulated by storing information of said event processing servers in the cache memory without obtaining the list of said event processing servers and selecting the event processing server where the distance on the network with respect to said application is shortest and information of the event processing servers stored in the cache memory and requests the event processing distributor to process the events.

13. The event processing system as set forth in claim 1, wherein said plurality of event distributors transmit events received directly from the event generation source to said event processing servers.

14. The event processing system as set forth in claim 1, wherein said first event unit which causes said event generation source to obtain a list where information of said event distributors is described from said event processing distributor.

15. The event processing system as set forth in claim 1, wherein said selected event distributor is configured to transmit said event to said selected event processing server indicated by the event transmission rule.

16. An event processing method, comprising:
causing a plurality of event processing servers to process transmitted events according to an event processing rule set in advance and notify an application of processing results;
causing a plurality of event distributors to transmit events received from an event generation source to at least one of said event processing servers according to an event transmission rule set in advance which defines the at least one of said event processing servers to which the events received from the event generation source is to be transmitted;
causing an event processing distributor to set the event processing rule received from said application to said event processing servers and to set the event transmission rule to said plurality of event distributors;
executing first event processing for causing said event generation source to obtain a list where information of said event distributors is described, to select the event distributor where a distance on a network with respect to said event generation source is shortest, from the list, and to transmit said event to the selected event distributor; and
executing second event processing for causing said application to obtain a list where information of said event processing servers is described from the event processing distributor, to select the event processing server where the distance on a network with respect to said application is shortest, from the list, and to transmit an event processing request where information of said selected event processing server is added to said event processing distributor,
wherein the event processing distributor is caused to set an event transmission rule indicating said selected event processing server based on the transmitted event processing request to said selected event distributor.

17. The event processing method as set forth in claim 16, wherein said plurality of event processing servers is disposed in a plurality of data centers, and
said event processing distributor sets said event processing rule to another event processing server disposed in the same data center as said selected event processing server.

18. The event processing method as set forth in claim 17, wherein, when said application selects the event processing server where the distance on the network with respect to the application is shortest, said application extracts the event processing servers, which are described in a list of said event processing servers and are disposed in said data centers, one by one from said data centers, measures round-trip times which are needed for communication with the extracted event processing servers, and selects the event processing server including the shortest round-trip time.

19. The event processing method as set forth in claim 16, wherein, when said event generation source selects the event distributor where the distance on the network with respect to the event generation source is shortest, said event generation source measures round-trip times which are needed for communication with the event distributors described in the list of said event distributors, and selects the event distributor including the shortest round-trip time.

20. The event processing method as set forth in claim 16, wherein, when said event generation source selects the event distributor where the distance on the network with respect to the event generation source is shortest, said event generation source selects the event distributor including a network address where the distance on a network with respect to the event generation source is shortest, while viewing a network address portion of addresses of the event distributors described in the list of said event distributors.

21. The event processing method as set forth in claim 16, wherein said event generation source includes a cache memory, and
when said event generation source transmits the events, said event generation source stores information of the previously selected event distributor in the cache memory without obtaining the list of said event distributors and selecting the event distributor where the distance on the network with respect to the event generation source is shortest, and transmits the events to the stored event distributors.

22. The event processing method as set forth in claim 16, wherein said event processing distributor sets said event processing rule to said event processing server selected by adding an event processing request.

23. The event processing method as set forth in claim 16, wherein, when said application selects the event processing server where the distance on the network with respect to the application is shortest, said application measures round-trip times which are needed for communication with each of the event processing servers described in a list of said event processing servers, and selects the event processing server including the shortest round-trip time.

24. The event processing method as set forth in claim 16, wherein, when said application selects the event processing server where the distance on the network with respect to the application is shortest, said application selects the event processing server including a network address where the distance on the network with respect to the application is shortest, while viewing a network address portion of addresses of each of the event processing servers described in a list of said event processing servers.

25. The event processing method as set forth in claim 16, wherein said application includes a cache memory, and when said application requests the second event processing, said application adds a list of the event processing servers accumulated by storing information of said event processing servers in said cache memory without obtaining the list of said event processing servers and selecting the event processing server where the distance on the network with respect to said application is shortest and information of the stored event processing servers and requests the event processing distributor to process the events.

26. An event processing system, comprising:
a plurality of event processing servers, connected to a network, which are configured to process transmitted events according to an event processing rule set in advance and to notify an application of processing results;
a plurality of event distributors, connected to the network, which are configured to transmit events received from an event generation source to at least one of said event processing servers according to an event transmission rule set in advance which defines the at least one of said event processing servers to which the events received from the event generation source is to be transmitted, wherein each respective event transmission occurs without using an additional one of the plurality of event distributors; and
an event processing distributor, connected to the network, which is configured to set the event processing rule received from said application to said event processing servers, and which is configured to set the event transmission rule to said plurality of event distributors; and
an event unit which is configured to cause said application to obtain a list where information of said event processing servers is described from the event processing distributor, to select the event processing server where the distance on a network with respect to said application is shortest, from the list, and to transmit an event processing request where information of said selected event processing server is added to said event processing distributor,
wherein the event processing distributor is configured to set an event transmission rule indicating said selected event processing server based on the transmitted event processing request to said selected event distributor, and
wherein said plurality of event processing servers are disposed in a plurality of data centers.

27. The event processing system as set forth in claim 26,
wherein a first event unit which is configured to cause said event generation source to obtain a list where information of said event distributors is described from said event processing distributor.

28. The event processing system as set forth in claim 26,
wherein said plurality of event distributors are configured to transmit events received directly from an event generation source to said event processing servers.

29. The event processing system as set forth in claim 26,
wherein said event processing distributor is configured to receive an event processing request from the application and to set said event transmission rule to at least one of the plurality of event distributors, such that events handled according to the event processing request are transmitted to a selected one of the plurality of event processing servers.

* * * * *